United States Patent
Biziorek et al.

(10) Patent No.: US 12,514,165 B2
(45) Date of Patent: Jan. 6, 2026

(54) BALER AND METHOD OF OPERATING A BALER

(71) Applicant: DEERE & COMPANY, Moline, IL (US)

(72) Inventors: Stéphane Biziorek, Gray (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 2 days.

(21) Appl. No.: 18/643,588

(22) Filed: Apr. 23, 2024

(65) Prior Publication Data

US 2025/0024788 A1    Jan. 23, 2025

(30) Foreign Application Priority Data

Jul. 18, 2023    (DE) .......................... 102023118921.2

(51) Int. Cl.
*A01F 15/07*    (2006.01)

(52) U.S. Cl.
CPC .... *A01F 15/0715* (2013.01); *A01F 2015/076* (2013.01)

(58) Field of Classification Search
CPC .... A01F 15/07; A01F 15/071; A01F 15/0715; A01F 2015/076; B65B 57/02
USPC ..................................................... 53/64, 587
See application file for complete search history.

(56) References Cited

U.S. PATENT DOCUMENTS

| | | | |
|---|---|---|---|
| 6,778,894 B2 * | 8/2004 | Beck et al. .......... | A01D 41/127 701/50 |
| 2020/0008357 A1 | 1/2020 | Biziorek et al. | |
| 2020/0093067 A1 * | 3/2020 | Monteyne ........... | A01F 15/0715 |

FOREIGN PATENT DOCUMENTS

| EP | 1479283 A1 | 11/2004 |
|---|---|---|
| EP | 3636067 A1 | 4/2020 |

OTHER PUBLICATIONS

Extended European Search Report and Written Opinion issued in European Patent Application No. 24183576.8 dated Dec. 5, 2024, in 16 pages.

* cited by examiner

Primary Examiner — Stephen F. Gerrity

(57) ABSTRACT

A baler includes a baling chamber for baling a crop to form a bale, a wrapping installation for wrapping the bale with a wrapping material during a wrapping operation, a sensor for detecting a noise signal, a control unit which is connected to the sensor. The control unit is configured to characterize the wrapping operation on the basis of a noise signal from the sensor.

10 Claims, 3 Drawing Sheets

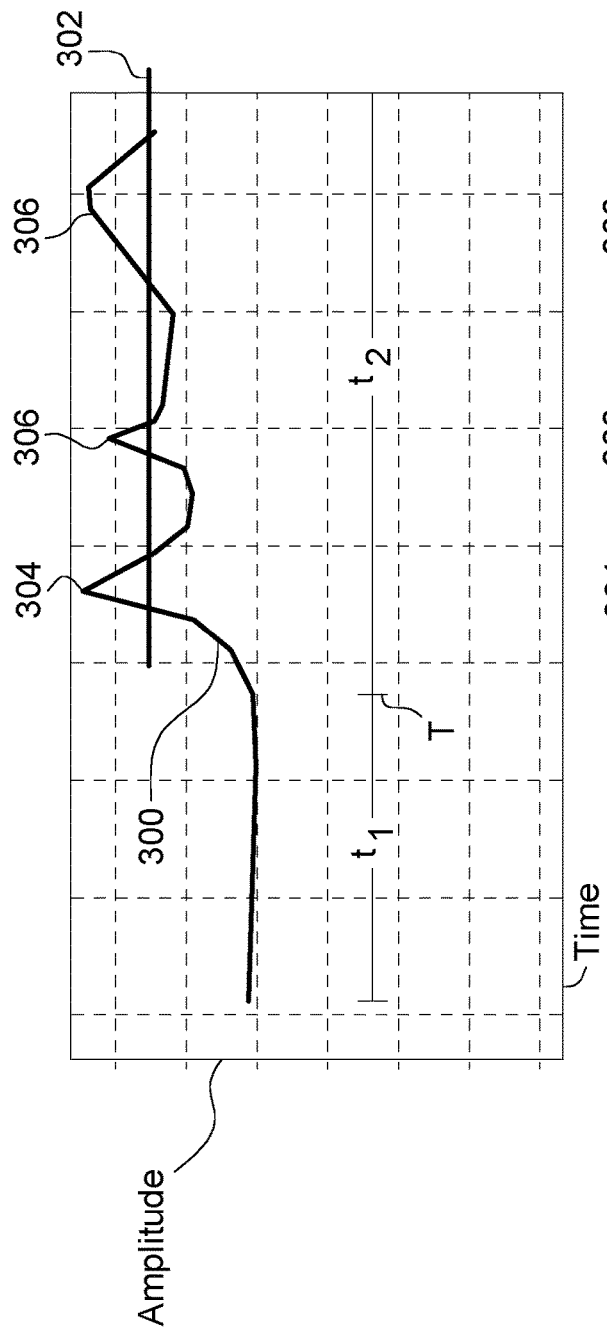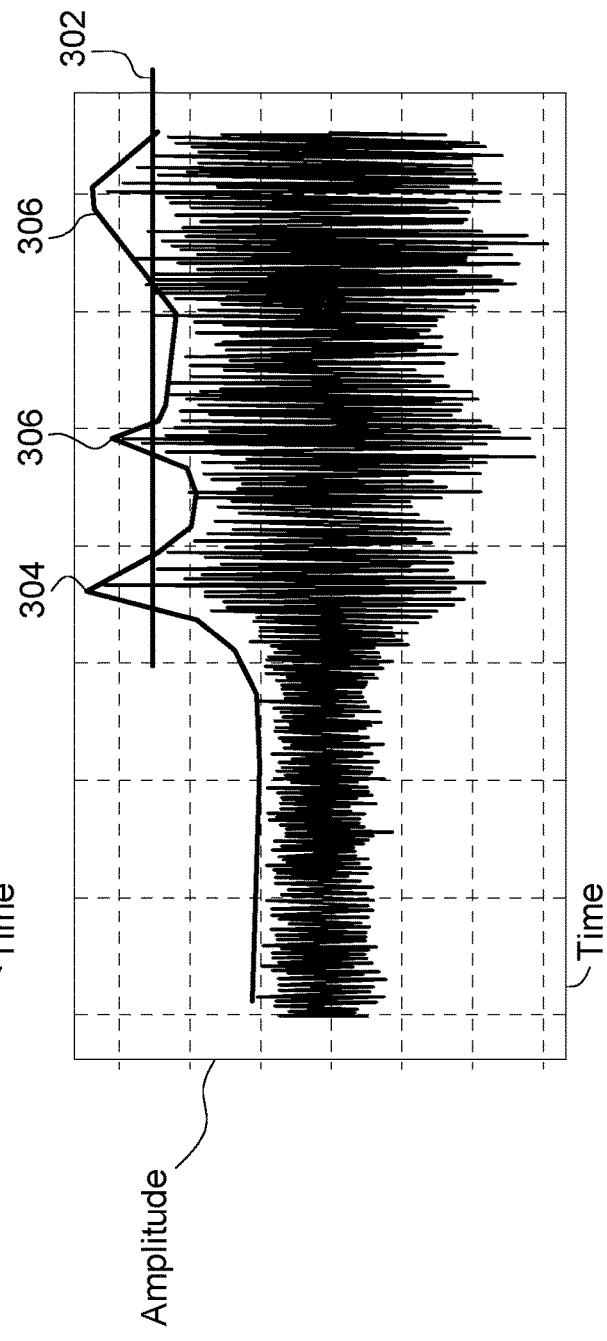

BALER AND METHOD OF OPERATING A BALER

CROSS-REFERENCE TO RELATED APPLICATIONS

This application claims the benefit of German Patent Application No. DE 102023118921.2, filed on Jul. 18, 2023, the disclosure of which is hereby incorporated by reference.

TECHNICAL FIELD

The disclosure generally relates to a baler implement and a method of operating the baler implement.

BACKGROUND

A baler implement, in particular a round baler or a square baler, are used for picking up and compressing crop, for example straw, hay or the like. For this purpose, the baler may comprise a pick-up unit for picking up the crop, in particular for picking up the crop from a swath. In this instance, the crop lying on the ground can be picked up by the pick-up unit, in particular a pick-up. The baler may also comprise a baling chamber. The baling chamber may comprise one or more baling means. The baling chamber can receive the crop picked up by the pick-up unit and compress it into a bale. The baler can moreover comprise a conveying unit. The crop which is picked up by the pick-up unit can be cut with the conveying unit, for example, a rotor and/or an underlying base with blades, and directed into the baling chamber. The conveying unit can be designed as part of the pick-up unit or be disposed downstream of the pick-up unit, in particular disposed downstream in the conveying direction. The bale, in particular the round bale or the square bale, is formed in the baling chamber. The fully formed bale can then be wrapped in the baling chamber with a wrapping material, for example a mesh, film or twine. The fully formed bale or the completely wrapped bale can be unloaded or ejected by a discharge unit, for example, an ejection flap or a rear member or a rear flap of the baler, being moved into an open position, and optionally via a ramp or particularly an ejector.

EP 1 479 283 A1 discloses a winding apparatus outside a baler. The winding apparatus comprises an apparatus for monitoring the run of web-like wrapping material between two spaced-apart locations in the web run by means of a sensor. In this case, the sensor identifies a typical noise when the winding material is drawn off and generates a signal. As soon as the signal is not present, it can be identified that no more winding material is available and the winding operation has to be interrupted.

A disadvantage of the known apparatuses for identifying the wrapping operation is that the operation is carried out either outside the baler, see EP 1 479 283 A1, or is carried out in a constructively complex and technically complicated manner with several sensors in the baling chamber.

SUMMARY

According to the disclosure, a baler implement is provided. The baler comprises a baling chamber for baling a crop to form a bale, and in particular to pick up a crop, and a wrapping installation for wrapping the bale, in particular the bale which is fully formed in the baling chamber, with a wrapping material in or during a wrapping operation. The baler further comprises a sensor for detecting a noise signal, preferably a noise signal which is emitted in the baler, particularly preferably a noise signal which is emitted in the baler during the wrapping operation, and a control unit which is connected to the sensor, particularly connected in a signal-transmitting manner. The control unit is configured to characterize a status of the wrapping operation on the basis of the noise signal, or a plurality of noise signals, from the sensor.

Therefore, the sensor can sense, in particular detect, a noise signal, in particular in the baler. The sensor can be configured to provide a sensor signal which comprises a noise information item of the noise signal which is emitted in the baler, in particular of the wrapping operation. The noise signal, in particular the emitted noise signal, may comprise, for example, noise portions which are caused by the vibration of the baler and/or the noise which is emitted by the wrapping installation and/or by the wrapping operation. In other words, one or more noise signals, in particular the noise of a wrapping operation in the baler, may be able to be detected with the sensor in the form of a sensor signal.

The sensor is connected to the control unit, in particular connected in a signal-transmitting manner. The sensor signal can thereby be sent by the sensor to the control unit and/or received by the control unit. The sensor can detect a noise signal and provide it in the form of an electrical sensor signal.

The baler can be a square baler for forming square bales, or a round baler for forming round bales from crop. The baler may comprise a baler frame. The baler can also be integrated into a towing vehicle, i.e. the baler can be designed as a self-propelling baler. The baler may be supported on the ground by wheels. The baling chamber may comprise one or more baling means. The baler can moreover comprise a conveying unit. The bale can be formed with the baling chamber, in particular in a baling phase. The baler may comprise a pick-up unit, in particular a pick-up, for picking up crop from the ground and particularly to pick up the crop of a swath. The pick-up unit can further be configured to supply the picked-up crop to the baling chamber.

The baler comprises a wrapping installation for wrapping the bale, in particular the fully formed bale, with a wrapping material. The wrapping material may be, for example, mesh, film or twine. The fully formed bale can be wound up with the wrapping material in or during a wrapping operation, in particular in the baling chamber.

The baler can comprise the discharge unit, for example, an ejection flap or a rear member or a rear flap of the baler. The fully formed bale or fully wrapped bale can be unloaded or discharged when the discharge unit is in the second position, i.e. the baling chamber is open. The discharge unit can be arranged pivotably on the baler, in particular on the baler frame or on a housing part, preferably connected thereto and/or fastened thereto and/or carried thereon, particularly preferably being pivotably mounted. The baler may be designed with a variable-size baling chamber or in the form of a baler with a variable baling chamber. The baler with a variable-size baling chamber may comprise one or more baling means, wherein the baling means may be, in particular, in the form of a belt or strap or chain assembly or band. The baler may equally also comprise a size-invariable baling chamber. In this case, a compression means can be designed as one or more compression rollers, which, in particular, are arranged as compression rollers running parallel to one another, for compressing the crop. The axes of rotation of the baling rollers may lie on an arc in the case of a closed discharge unit, and at least one of the baling rollers may be driven. The arrangement of the baling rollers in the baling chamber may correspond to a cylindrical shape, such that the baling rollers are arranged cylindrically about the round bale and form a cylindrical circumferential surface. The baling chamber may be arranged on the baler frame, preferably connected thereto and/or fastened thereto. The pick-up unit for picking up or for collecting crop lying or standing in a field, i.e. on the ground, and/or for conveying the crop into the baling chamber, can likewise be arranged on the baler frame, preferably connected to the latter and/or fastened to the latter.

The baler may comprise an actuator, for example, a first actuator. The actuator can be designed and/or configured for setting and/or adjusting the discharge unit, for example the ejection flap or a rear part or a rear flap of the baler. The discharge unit of the baler can be settable and/or adjustable by means of the actuator. The control unit can be connected to the actuator via a valve arrangement. The actuator can be, for example, in the form of a hydraulic cylinder or pneumatic cylinder or lifting cushion or screw drive or rack and pinion drive or electric cylinder. The actuator can be connected, in particular fastened and/or articulated, at one end, for example to the piston, to the discharge unit, and at the other end, for example to the cylinder, to the baler, for example to the baler frame or housing. The actuator can equally also be fastened or articulated the other way around. The actuator can be drivable by means of the control unit in such a way that the discharge unit can be moved between a first position, in which the baling chamber is closed, in particular in which the discharge unit closes the baling chamber, and a second position, in which the baling chamber is open, in particular in which the bale can be discharged. The actuator can also be drivable by means of the control unit in such a way that the discharge unit can assume any position between the first and second positions.

The baler may comprise one or more bale sensors for detecting a size of the bale, for example, a volume or diameter or the radius of the bale, and/or a tension of the pressing means and/or a distribution of the crop, in particular a lateral distribution of the crop. The bale sensor(s) can sense the size of the bale and/or a tension of the pressing means or a distribution of the crop in the form of a bale signal. The bale sensor(s) can be arranged on or in the baling chamber and/or the pick-up unit. The bale sensor(s) can be distributed, for example, over a width of the baling chamber and/or the pick-up unit in order to obtain in particular a uniform distribution of the crop in the baling chamber and thus uniformly shaped bales. The bale sensor(s) can be connected to the control unit. The bale signal can be transmitted by the bale sensor(s) to the control unit, or be received by the control unit from the bale sensor(s), respectively. The control unit can generate the discharge signal when the control unit receives the bale signal.

The control unit is configured to characterize a status of the wrapping operation on the basis of one or more sensor signals of the sensor. In other words, the baler may be able to be operated with the control unit in such a manner that it can characterize the wrapping operation with or on the basis of the sensor signal. The term "characterize" and/or "characterizing" may be understood in this case to mean that, for example, the wrapping operation can be assessed in terms of quality and/or quantity and/or the progression and/or status of the wrapping operation, that is to say, correctly or defectively, state of completion, etc., on the basis of the sensor signal or signals as a function of time. To this end, the amplitude and/or frequency of the noise signal can be established, in particular calculated and/or analyzed, in particular on the basis of the amplitude and/or frequency of the sensor signal. It is thereby advantageously possible to identify the wrapping operation in a constructively less complex manner because only one sensor is required to detect the noise in order to characterize the wrapping operation. It is further advantageous that it is possible to identify in a technically simple manner whether and how the wrapping operation took place.

In one embodiment of the disclosure, the control unit is configured to establish an amplitude and/or a frequency of the sensor signal and to characterize the wrapping operation with or on the basis of the amplitude and/or the frequency. Similarly, the control unit can be configured to compare the amplitude and/or frequency of the sensor signal with a threshold value, in particular to establish whether the amplitude and/or frequency is/are above a threshold value and/or to establish the number of amplitudes or frequencies above the threshold value. Each amplitude, in particular above the threshold value, may correspond in this case to a wrapping pass around the bale with wrapping material. The number of amplitudes above the threshold value may correspond to the number of wrapping steps. Advantageously, the beginning of the wrapping operation and/or the number of wrapping passes, particularly therefore a number of layers of wrapping material on the bale, can be established on the basis of the amplitude and/or frequency of the sensor signal and/or the amplitude above the threshold value.

In one embodiment of the disclosure, the noise signal(s) is/are able to be detected as a function of time. The control unit can be configured to characterize the wrapping operation on the basis of a sensor signal or a plurality of sensor signals of the sensor as a function of time. Furthermore, the control unit can be configured to establish one or more amplitudes and/or frequencies of the sensor signal(s) as a function of time and/or to compare the amplitudes and/or frequencies of the sensor signals as a function of time with a or the threshold value. As a result of detecting the noise signal as a function of time, the above characterization of the wrapping operation, particularly the progression, can be assessed with the sensor signal and/or the quality and quantity of the wrapping operation can be assessed with the amplitudes and/or frequencies.

In one embodiment of the disclosure, the control unit is configured to filter and/or process the sensor signal. In this case, the amplitude(s) and/or frequency(ies) can be changed and/or processed with filters. In particular, the sensor signal, particularly the sensor signal(s) as a function of time, can be processed with a Fourier transform and/or a high-pass filter and/or low-pass filter can be applied to the signals or the Fourier transform thereof. The amplitude(s) and/or frequency(ies) can thereby be established in a simple manner on the basis of the sensor signal(s), in particular the sensor signals as a function of time.

In one embodiment of the disclosure, the control unit is configured to generate and/or to send an error signal or a completion signal as a function of or with the sensor signal, in particular as a function of or with the amplitude and/or number of amplitudes above the threshold value. Additionally or alternatively, the control unit can be configured to generate and/or to send an error signal or a completion signal as a function of or with the frequency(ies) and/or number of frequencies above the threshold value. The error signal can be generated or sent, for example, if no amplitude and/or frequency is above the threshold value and/or the number of amplitudes and/or frequencies above the threshold value is too low, therefore particularly the number of layers of wrapping material on the bale or the established number of wrapping passes. The completion signal can be generated or sent, for example, if the amplitude and/or frequency is above the threshold value and/or the number of amplitudes and/or frequencies is above the threshold value, therefore particularly the number of layers of wrapping material on the bale and/or the established number of wrapping passes is sufficiently high, preferably at least 2 layers and/or wrapping passes, particularly preferably at least 4 layers and/or wrapping passes.

In one embodiment of the disclosure, the sensor is arranged on the baling chamber and/or on the wrapping installation and/or on a baler frame of the baler, preferably connected thereto or fastened thereto. The sensor can particularly be connected or fastened thereto contactlessly, that is to say, without touching the baling chamber or the wrapping installation or the baler frame. The sensor can be a noise sensor, in particular a microphone or an ultrasound sensor. The noise signal which is emitted in the baler can thereby be detected in a simple manner.

In one embodiment of the disclosure, the control unit is configured to characterize the wrapping operation on the basis of a model, which represents the wrapping operation, in accordance with the sensor signal of the sensor, in particular the sensor signal(s) as a function of time. In this case, the model can be a software depiction or simulation or a function, in particular a progression of the noise signal, of the wrapping operation. By means of a compensation calculation, the parameters of the function can be determined or estimated. Furthermore, the control unit can be configured to establish, in particular to calculate, the amplitude(s) and/or frequency(ies) on the basis of the model which represents the wrapping operation, in particular the function of the wrapping operation. The control unit can further be configured to compare the amplitude(s) and/or frequency(ies) with a or the threshold value and/or to establish the number of amplitudes, particularly above the threshold value. Each amplitude of the model may in this case correspond to a wrapping pass around the bale with wrapping material. The number of amplitudes above the threshold value may correspond to the number of wrapping steps. The control unit may further be configured to adapt and/or to improve the model with the noise signals detected by the sensor, in particular as a function of time, of the wrapping operation.

The disclosure further relates to a method for operating or running a baler. The method comprises the steps of wrapping a bale with a wrapping material, in particular in a baling chamber, in a wrapping operation or during a wrapping operation with a wrapping installation. A noise signal is detected, in particular in the baler, by a sensor. A control unit may then characterize the wrapping operation based on the noise signal from the sensor.

In other words, providing a sensor signal which comprises a detected noise signal, in particular in the baler, and/or a noise signal information item, in the baler by a sensor and providing a sensor signal by the sensor and characterizing the wrapping operation, in particular by a control unit, with the sensor signal of the sensor. The method has all the advantages and functions of the above-mentioned baler according to the disclosure. The method can further comprise picking up and baling a crop by a and/or in a baling chamber. The method can similarly comprise an amplitude of the sensor signal being established and the wrapping operation being characterized with the amplitude and/or the amplitude of the sensor signal being compared with a threshold value.

The sensor(s) and/or the input and output unit and/or all the other sensors, for example, the bale sensors, wrapping sensors and/or an ejection flap sensor, may be able to be operated with the control unit, preferably able to be actuated and/or controlled and/or regulated, particularly preferably adjusted and/or set. The control unit can be assigned to the baler. More specifically, if the baler is part of a combination of a towing vehicle, for example a tractor, the control unit can be assigned to the towing vehicle or to both jointly and/or can be arranged on or in them. The combination, in particular the towing vehicle or the baler or both together, can comprise the control unit. The control unit can also be designed as a towing vehicle control unit and/or baler control unit.

The control unit may be configured as an electronic module, as an embedded system, as a processing unit, as a computer, as a module for the open-loop and/or closed-loop control of the baler, preferably of the combination, i.e. of the towing vehicle and/or the baler. The control unit may be referred to as a controller. The control unit can comprise a processor, a store and/or all the software, hardware, algorithms, connections, particularly also sensors, which are necessary for controlling and/or regulating the baler. The method can be configured as a program or algorithm that can be executed on and/or by the control unit. The control unit may include any device which can analyze data from different sensors, compare data and make the necessary decisions in order to control and/or to regulate and/or to carry out the operation of the baler and the necessary functions for controlling and/or regulating the operation of the baler.

The control unit can be connected to the components of the combination, that is to say, particularly the sensor and/or the input and output unit and/or all other sensors, for example, the bale sensor(s), wrapping sensor(s) and/or the ejection flap sensor, preferably in a manner connected in terms of signals and/or transmitting signals and/or transmitting data. A signal connection and/or signal-transmitting and/or data-transmitting connection may be understood here inter alia to mean that signals and/or data are exchanged between the connected components. Signals and/or data may for example be received and transmitted, and/or processed and/or manipulated, by the control unit. In other words, the control unit is configured to receive signals and/or data from the sensor and/or the input and output unit and/or all other sensors, for example, the bale sensor(s), wrapping sensor(s) and/or the ejection flap sensor, and to send the signals/data to them. Similarly, the control unit can be configured to process and/or manipulate data and signals.

The connection between the control unit and the components of the baler, in particular of the combination, may be wired, that is to say in particular implemented by wire, and/or may be wireless, that is to say implemented by radio, for example by Bluetooth or WLAN. The communication bus may for example be Isobus, CAN bus, or similar. The control unit may be connected directly to the input and output unit which is arranged in a cab of the towing vehicle and by means of which data entered by an operator can be transmitted to the control unit or received from the control unit and output. It is however also conceivable for the control unit to be connected indirectly to the input and output unit by a superordinate control unit. The control unit can be integrated into the input and output unit or vice versa.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 3 is a schematic illustration of the progression of the sensor signal before and during the wrapping operation.

FIG. 4 is an illustration of the progression of the sensor signal before and during the wrapping operation.

DETAILED DESCRIPTION

Figure 1:
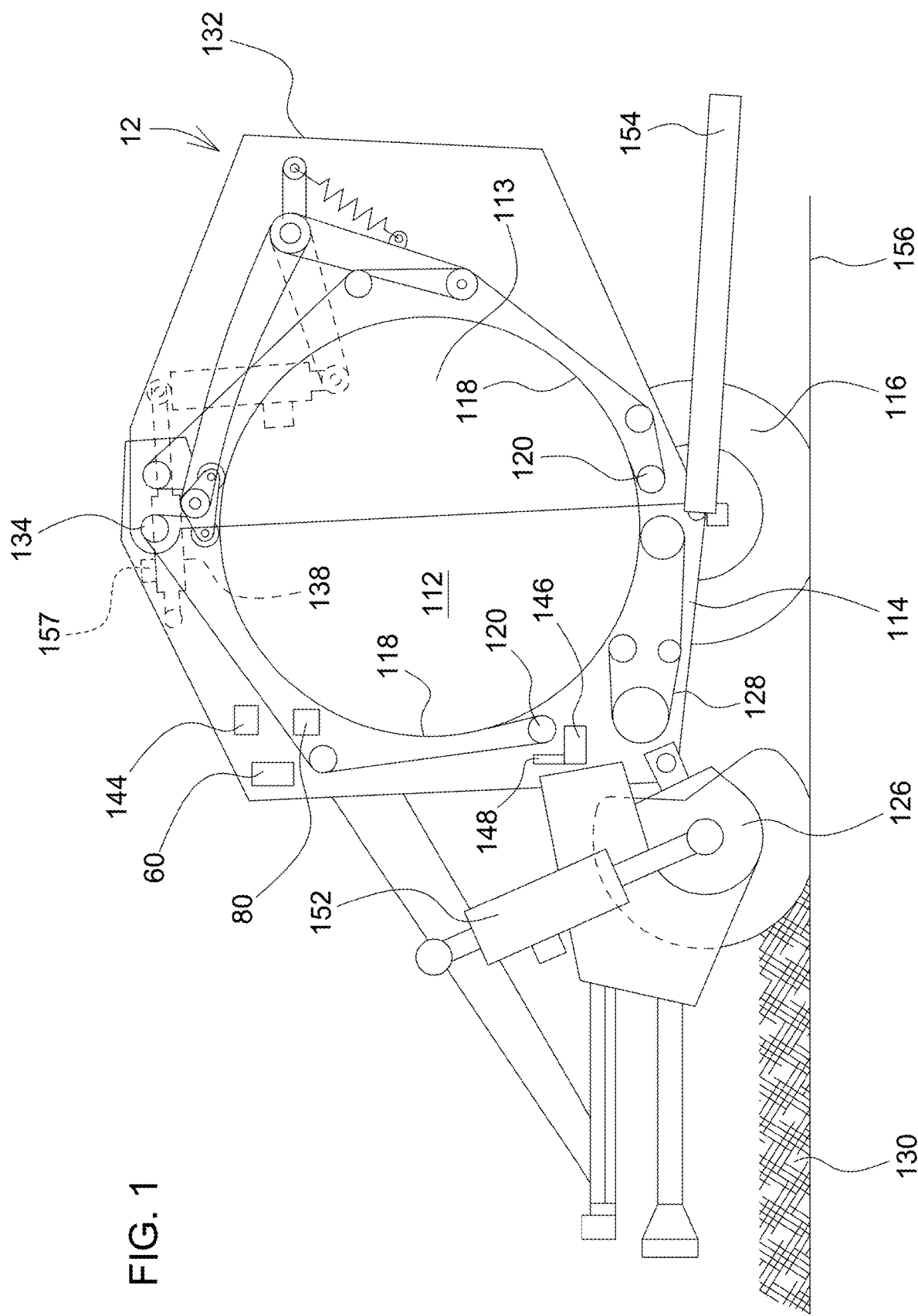
FIG. 1 is a schematic illustration of a baler according to the disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a baler implement is generally shown at 12. The baler 12 comprises a pick-up unit 126 for picking up crop, and a baling chamber 112 in order to form or compress the picked-up crop into a bale 113. The baler 12 comprises a control unit 60. The baler 12 can comprise a baler frame 114. The baler frame 114 can be supported on wheels 116. The baling chamber 112 can be disposed at or on the baler frame 114, preferably connected to the latter and/or fastened to the latter and/or carried.

The baler 12 is designed with a variable-size baling chamber 112, or as a baler 12 with a variable baling chamber 112. The pressing means 118 is designed as a band or belt. The pressing means 118 surrounds the baling chamber 112 and is guided by rollers 120. However, the baler 12 can also comprise a size-invariable baling chamber. In this instance, the pressing means 112 can be designed as one or a plurality of pressing rollers, in particular a multiplicity of pressing rollers running parallel to one another, for compressing the crop.

The pick-up unit 126, in particular in the form of a pick-up, is disposed on the baler 12 and/or connected thereto, in particular below the front edge of the baler 12. The pick-up unit 126 can comprise tines moving or rotating about a transverse axis. The pick-up unit 126 can be followed in a crop flow direction by a conveyor unit, presently a conveyor belt 128, of the baler 12. The conveyor belt 128 could also be replaced by a rotor (not shown), or a rotor could be inserted in the crop flow direction between the pick-up unit 126 and the conveyor belt 128. Instead of the pick-up unit 126, in particular the pick-up, other suitable crop pick-up means, such as mowing and conveying units, could also be used.

The pick-up unit 126 collects harvested crop lying in particular on the field in a swath 130, for example, of grass, hay or straw, and feeds said crop to the baling chamber 112. The pressing means 118, in particular one or a plurality of bands or straps, can be set in motion in the longitudinal direction thereof during a baling process in that one or a plurality of the rollers 120 is/are rotatingly driven. The crop introduced into the baling chamber 112 therefore also rotates during the pressing. During the pressing procedure, the size of the baling chamber 112 increases over time. The baler 12 comprises a discharge unit 132, for example an ejection flap or a rear part or a rear flap of the baler. The discharge unit 132 is pivotably mounted on the baler 12, in particular on the baler frame 114 or on a housing part. The discharge unit 132 is pivotable about an axis 134 which extends transversely to the forward direction of a towing vehicle and/or of the baler 12. The discharge unit 132 can be moved between a first position, in which the baling chamber 112 is closed, and a second position, in which the baling chamber 112 is open for unloading of the bale. Furthermore, the baler 12 may comprise a ramp 154 in order to set down the bale 113 on the ground 156.

The control unit 60 is connected to an actuator 138. The actuator 138 can be, for example, in the form of a pneumatic cylinder or lifting cushion or screw drive or rack and pinion drive or electric cylinder. In the present case, the actuator 138 is designed as a hydraulic cylinder. The control unit 60 can be connected to the actuator 138, in particular via a valve arrangement 80, in particular a first valve arrangement. The discharge unit 132 can be moved by means of the actuator 138 between the first position, in which the baling chamber 112 is closed, and the second position, in which the baling chamber 112 is open for unloading of the bale. The actuator 138 in the form of a hydraulic cylinder is connected, in particular pivotably fastened, at one end to the baler 12, for example to the baler frame 114 or the housing, and at a second end to the discharge unit 132. However, the discharge unit 132 can also be pivotably articulated, i.e. pivotably fastened to a pivot point. The actuator 138 can be connected to the discharge unit 132 in such a manner that it can pivot the discharge unit 132 upwards about the axis 134 (counterclockwise in FIG. 1), thus enabling the bale 113 to be discharged from the baling chamber 112. The discharge unit 132 can therefore be opened or closed or raised and lowered by means of the actuator 138. The actuator 138 can be adjusted and/or set, in particular controlled and regulated, with the control unit 60 with or via the valve arrangement 80, for example, via an electromagnetic or hydraulic valve arrangement. The valve arrangement 80 can be adjusted and/or set, in particular controlled and regulated, with the control unit 60. An ejection flap sensor 157 can sense, for example, the position of the actuator 138 or of the discharge unit 132.

The baling press 12 comprises a wrapping installation 146 for wrapping the bale with a wrapping material during a wrapping operation. The wrapping installation 146 can be disposed on, in particular in the vicinity of, the baling chamber 112. The wrapping installation 146 can be connected to the control unit 60 as soon as it is instructed by the control unit 60 to discharge a wrapping material, such as twine, band, mesh or packing bows, to the baling chamber 112. The rotating bale 113 can pull on the wrapping material or trap same such that it is then wrapped around the bale 113.

The baling press 12 may comprise a sensor 148 for detecting a noise signal. The sensor 148 is connected to the control unit 60. The control unit 60 is configured to characterize the wrapping operation on the basis of a sensor signal of the sensor 148. The sensor 148 can therefore interact with the wrapping installation 146 and detect the wrapping operation.

The baler 12 can comprise a bale sensor 144 in order to sense the size of a bale in the baling chamber 112 or with which a size of a bale is sensed. The control unit 60 can be connected to the bale sensor 144, preferably connected in terms of signals and/or connected for transmitting signals and/or connected for transmitting data. The control unit 60 may be connected to the bale sensor 144, for example, by means of a cable, in particular with a releasable plug, or via a radio link. The bale sensor 144 can be disposed on or in the baling chamber 112, in particular fastened in the latter. The bale sensor 144 can detect, for example, the distance from the bale surface or from the pressing means 118 resting against the bale surface, and in this way can provide information about the size of the bale, in particular the radius and/or the bale diameter. The size of the bale sensed by the bale sensor 144 or the bale shape can be displayed to the operator on the input and output unit.

The pick-up unit 126 can be raised and lowered, for example by a further or third actuator 152, here in the form of a hydraulic cylinder. The additional actuator 152 can be adjusted and/or set, in particular controlled and regulated, with the control unit 60, for example, via the valve arrangement 80 or an additional or third valve arrangement (not illustrated). The further valve arrangement can be, for example, a hydraulic or electromagnetic valve arrangement. The further valve arrangement can be adjusted and/or set, in particular controlled and regulated, with the control unit 60.

Figure 2:
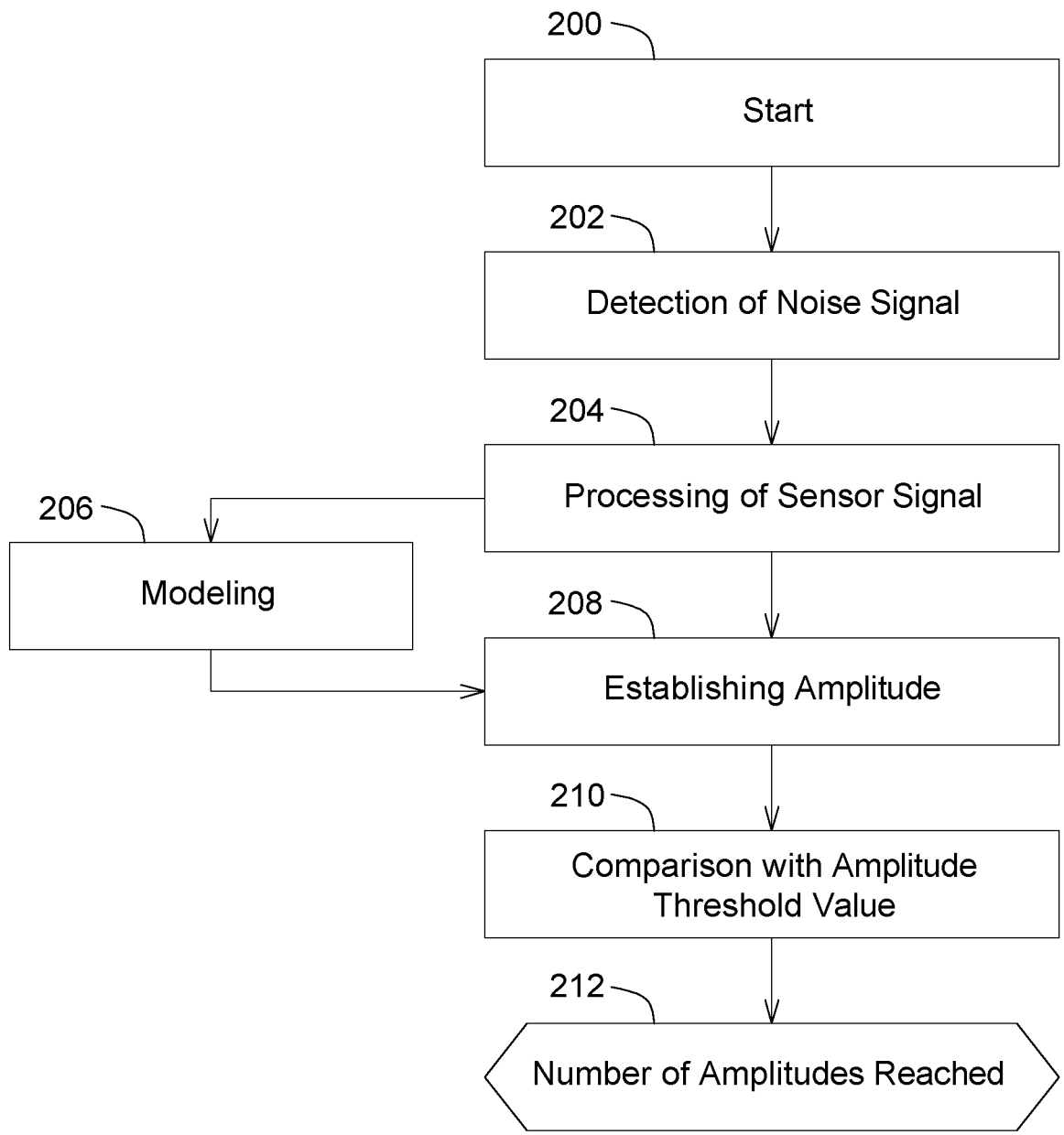
FIG. 2 is a schematic flow chart of a method according to the disclosure.

FIG. 2 shows a schematic flow chart of the method according to the disclosure, in particular showing how the control unit 60 operates and the sequence of the method. The operation shown in FIG. 2 can be carried out with the baler 12 shown in FIG. 1, wherein only the details and/or differences from FIG. 1 are discussed below. After the start in step 200, there follows the step 202 in which a noise signal in the baler 12 is detected with the sensor 148. In this case, the wrapping operation is characterized on the basis of a sensor signal of the sensor 148. In particular, the noise signals are detected as a function of time. In this case, the wrapping operation can be characterized on the basis of the sensor signals of the sensor 148 as a function of time. The term "characterized" may be understood to mean that the wrapping operation is detected and/or reproduced by the sensor signals, in particular by the sensor signals as a function of time. In an optional step 204, the sensor signal, in particular the sensor signals as a function of time, can be filtered and/or processed, in particular the amplitude thereof can be changed. In particular, the sensor signal, in particular the sensor signals as a function of time, can be processed with a Fourier transform and/or a high-pass filter and/or a low-pass filter can be applied to the signals or the Fourier transform thereof.

In an optional step 206, the wrapping operation can be characterized on the basis of a model which represents the wrapping operation in accordance with the sensor signal of the sensor, in particular of the sensor signals as a function of time. In this case, the model may be a software depiction or simulation or a function of the wrapping operation. By means of a compensation calculation, the parameters of the function can be determined or estimated. In an optional step 208, the amplitudes of the sensor signal, in particular the sensor signals as a function of time, and/or the amplitudes of the Fourier transform of the sensor signal, in particular the sensor signals as a function of time, can be established. Similarly, the amplitudes can be established on the basis of the model representing the wrapping operation. In another optional step 210, the amplitude of the sensor signal, in particular the amplitudes of the sensor signal as a function of time, and/or amplitudes of the model representing the wrapping operation, can be compared with a threshold value. In another optional step 212, in accordance with the sensor signal an error signal or a completion signal can be generated and/or sent. Similarly, the error signal or completion signal can be generated or sent in accordance with the number of amplitudes above the threshold value. In this case, each amplitude, in particular above the threshold value, can correspond to a wrapping pass, that is to say, a layer of wrapping material on the bale.

FIG. 3 shows a schematic illustration of the progression of the sensor signal 300 before and during the wrapping operation. FIG. 4 shows an illustration of the progression of the sensor signal 300 before and during the wrapping operation. The sensor signal shown in FIGS. 3 and 4 substantially corresponds to the sensor signal 300 which is disclosed in FIGS. 1 and 2 so that only details and/or differences are discussed below. The sensor signal 300 shown may be the sensor signal of the sensor 148, in particular the sensor signal as a function of time, or the representative model, in particular a function of the sensor signal as a function of time. In a time portion $t_1$, the sensor signal 300 is below the threshold value 302. Only the noise which is caused, for example, by vibrations, in particular of the baler, is detected. From the time T, an additional time period $t_2$ to which the wrapping operation correspond begins. From this time T, the amplitude of the sensor signal 300 increases. The first amplitude 304 may, for example, correspond to the time of introduction of the wrapping material into the baling chamber and/or the first wrapping pass. The additional amplitudes 306 may be additional wrapping passes. The first and the additional amplitudes 304, 306 are above the threshold value 302.

The control unit 60 may be configured as an electronic module, as an embedded system, as a processing unit, as a computer, as a module for the open-loop and/or closed-loop control of the baler, preferably of the combination, i.e. of the towing vehicle and/or the baler. The control unit 60 may be referred to as a controller. The control unit 60 can comprise a processor, a store and/or all the software, hardware, algorithms, connections, particularly also sensors, which are necessary for controlling and/or regulating the baler. The method can be configured as a program or algorithm that can be executed on and/or by the control unit 60. The control unit 60 may include any device which can analyze data from different sensors, compare data and make the necessary decisions in order to control and/or to regulate and/or to carry out the operation of the baler and the necessary functions for controlling and/or regulating the operation of the baler.

The control unit 60 can be connected to the components of the combination, that is to say, particularly the sensor and/or the input and output unit and/or all other sensors, for example, the bale sensor(s), wrapping sensor(s) and/or the ejection flap sensor, preferably in a manner connected in terms of signals and/or transmitting signals and/or transmitting data. A signal connection and/or signal-transmitting and/or data-transmitting connection may be understood here inter alia to mean that signals and/or data are exchanged between the connected components. Signals and/or data may for example be received and transmitted, and/or processed and/or manipulated, by the control unit 60. In other words, the control unit 60 is configured to receive signals and/or data from the sensor and/or the input and output unit and/or all other sensors, for example, the bale sensor(s), wrapping sensor(s) and/or the ejection flap sensor, and to send the signals/data to them. Similarly, the control unit 60 can be configured to process and/or manipulate data and signals.

The connection between the control unit 60 and the components of the baler, in particular of the combination, may be wired, that is to say in particular implemented by wire, and/or may be wireless, that is to say implemented by radio, for example by Bluetooth or WLAN. The communication bus may for example be Isobus, CAN bus, or similar. The control unit 60 may be connected directly to the input and output unit which is arranged in a cab of the towing vehicle and by means of which data entered by an operator can be transmitted to the control unit 60 or received from the control unit 60 and output. It is however also conceivable for the control unit 60 to be connected indirectly to the input and output unit by a superordinate control unit 60. The control unit 60 can be integrated into the input and output unit or vice versa.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement comprising:
   a baling chamber for baling a crop to form a bale;
   a wrapping installation for wrapping the bale with a wrapping material during a wrapping operation;
   a sensor for detecting a noise signal and generating a sensor signal indicative of the noise signal; and
   a controller which is connected to the sensor, wherein the controller is configured for:
      establishing an amplitude and a frequency of the sensor signal;
      comparing each of the established amplitudes of the sensor signal with a threshold value to determine if each of the established amplitudes is above the threshold value;
      counting a number of the established amplitudes that are above the threshold value during a period of time;
      characterizing the wrapping operation on the basis of the number of the amplitudes of the sensor signal greater than the threshold value during the period of time.

2. The baler implement set forth in claim 1, wherein the noise signal is detected as a function of time, and wherein the controller is configured to characterize the wrapping operation on the basis of the sensor signal of the sensor as a function of time.

3. The baler implement set forth in claim 2, wherein the controller is configured to establish the number of the amplitudes of the sensor signal as a function of time and to compare the number of the amplitudes of the sensor signal as a function of time with the threshold value.

4. The baler implement set forth in claim 1, wherein the controller is configured to process the sensor signal with a Fourier transform.

5. The baler implement set forth in claim 4, wherein the controller is configured to filter the Fourier transform of the sensor signal using one of a high-pass filter or a low-pass filter.

6. The baler implement set forth in claim 1, wherein the controller is configured to generate one of an error signal or a completion signal as a function of the number of the amplitudes of the sensor signal above the threshold value.

7. The baler implement set forth in claim 1, wherein the sensor is arranged on one of the baling chamber, the wrapping installation or a frame of the baler implement.

8. The baler implement set forth in claim 1, wherein the sensor is one of a microphone or an ultrasonic sensor.

9. The baler implement set forth in claim 1, wherein the controller is configured to characterize the wrapping operation based on the sensor signal indicative of the noise signal using a model saved on the controller, wherein the model represents the wrapping operation, in accordance with the noise signal as a function of time during the wrapping operation.

10. A method of operating a baler implement, the method comprising the steps of:
   wrapping a bale with a wrapping material in a wrapping operation with a wrapping installation;
   detecting a noise signal with a sensor during the wrapping operation, whereby the sensor generates a sensor signal indicative of the noise signal;
   establishing an amplitude and a frequency of the sensor signal;
   comparing each of the established amplitudes of the sensor signal with a threshold value to determine if each of the established amplitudes is above the threshold value;
   counting a number of the established amplitudes that are above the threshold value during a period of time;
   characterizing the wrapping operation as a number of layers of wrapping material on the bale, with a controller, based on the number of the amplitudes of the sensor signal greater than the threshold value during the period of time.

* * * * *